(12) United States Patent
Oshiro

(10) Patent No.: US 8,297,117 B2
(45) Date of Patent: Oct. 30, 2012

(54) APPARATUS, METHOD, AND PROGRAM FOR DETECTING DECREASE IN TIRE AIR PRESSURE

(75) Inventor: Yuji Oshiro, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 87 days.

(21) Appl. No.: 12/966,353

(22) Filed: Dec. 13, 2010

(65) Prior Publication Data

US 2011/0271745 A1 Nov. 10, 2011

(30) Foreign Application Priority Data

May 7, 2010 (JP) ................................. 2010-107324

(51) Int. Cl.
*G01M 17/02* (2006.01)
(52) U.S. Cl. ........................................................ 73/146
(58) Field of Classification Search .......... 73/146–146.8
See application file for complete search history.

(56) References Cited

U.S. PATENT DOCUMENTS

| | | | |
|---|---|---|---|
| 5,497,657 A * | 3/1996 | Taguchi et al. .............. 73/146.2 |
| 5,553,491 A * | 9/1996 | Naito et al. .................. 73/146.5 |
| 5,591,906 A * | 1/1997 | Okawa et al. ................ 73/146.5 |
| 7,340,369 B2 * | 3/2008 | Oshiro .......................... 702/148 |
| 7,665,353 B2 * | 2/2010 | Oshiro ............................ 73/146 |
| 8,130,090 B2 * | 3/2012 | Oshiro .......................... 340/444 |
| 2005/0087008 A1 * | 4/2005 | Yanase ............................ 73/146 |
| 2010/0225463 A1 * | 9/2010 | Fujita et al. .................. 340/443 |
| 2011/0107828 A1 * | 5/2011 | Kawasaki ..................... 73/146.2 |

FOREIGN PATENT DOCUMENTS

| | | |
|---|---|---|
| JP | 63-305011 A | 12/1988 |
| JP | 2007-182211 A | 7/2007 |
| JP | 2010-126119 A | 6/2010 |

* cited by examiner

*Primary Examiner* — Andre Allen
(74) *Attorney, Agent, or Firm* — Birch, Stewart, Kolasch & Birch, LLP

(57) ABSTRACT

An apparatus includes an acceleration calculation means for calculating, based on rotation speed information obtained from a rotation speed detection means, accelerations of the respective tires; an acceleration variation calculation means for calculating acceleration variations of the tires; a comparison means for comparing the acceleration variations; a presumption means for presuming a pressure decrease of a tire; an examination means for identifying, based on the tire rotation speed information, a tire having a rotation speed that is higher than the rotation speeds of the other tires or that is lower than a predetermined criterion; and a determination means for determining, when a tire identified by the presumption means is identical with a tire identified by the examination means, a pressure decrease of the tire.

6 Claims, 5 Drawing Sheets

APPARATUS, METHOD, AND PROGRAM FOR DETECTING DECREASE IN TIRE AIR PRESSURE

TECHNICAL FIELD

The present invention relates to an apparatus, a method, and a program for detecting a decrease in a tire air pressure.

BACKGROUND ART

Run flat tires are designed to enable, even when the tires are punctured and air therein is lost, a running for a distance of about 100 km. Thus, by the use of the run flat tires, it is possible to avoid a situation where the vehicle is stopped at a dangerous place such as a road having a heavy traffic to change a punctured tire or to fix the puncture, so that the user is allowed to drive the vehicle to the nearest service station to perform maintenance on the vehicle safely. Furthermore, the run flat tires also eliminate the need to carry a spare tire on the vehicle, thus providing advantages such as an increased trunk space and improved fuel consumption by the vehicle having a lighter weight.

On the other hand, in the case of a tire like the run flat tire by which the vehicle can run even when the air pressure is zero, a conventional method focusing attention on a change in the tire rotation radius (see Patent Literature 1 for example) has a difficulty in determining a decrease in the air pressure. Thus, when the vehicle continues to run at a high speed with a decreased air pressure, the tires may burst.

Thus, in order to detect an abnormal air pressure of a tire when the air pressure of the tire is completely zero, there has been suggested a method in which the variations in the accelerations of the respective tires are compared (see Patent Literature 2 for example).

In the method according to Patent Literature 2, the variations in the acceleration of the respective tires are calculated and are compared. When the comparison result shows that a tire has an acceleration variation larger than those of the other tires, it is determined that the tire has an abnormal air pressure.

In the case of the method according to Patent Literature 2 however, a disadvantage is caused as described below. Specifically, when a snow chain is attached to a tire among four tires having a normal pressure, the acceleration variation calculated based on the rotation speed of the tire fitted with the snow chain is different from the acceleration variations calculated based on the rotation speeds of the other tires. Thus, the tire fitted with the snow chain is wrongly judged to have an abnormal air pressure, despite the fact that it has a normal internal pressure.

To prevent this, the present inventor has suggested an apparatus and a method by which a tire having a completely-zero air pressure can be accurately detected without causing a false alarm (Japanese Patent Application No. 2008-306125 which will be hereinafter referred to as "the invention of the previous application").

The invention of the previous application was made based on the knowledge that, when one tire has a completely-zero air pressure, there is a case where the tire has a rotation speed higher than the rotation speeds of the other tires and there is also a contrary case where the tire has a rotation speed lower than the rotation speeds of the other tires and the degree of such delay in rotation speed is more significant than that in the case of the tire fitted with a snow chain. The invention of the previous application includes: a rotation speed detection means for periodically detecting tire rotation speeds of the respective wheels of a vehicle; an acceleration calculation means for calculating accelerations of the respective tires based on rotation speed information obtained from the rotation speed detection means; an acceleration variation calculation means for calculating acceleration variations of the respective tires based on the accelerations of the respective tires calculated by the acceleration calculation means; a comparison means for comparing the acceleration variation of the respective tires calculated by the acceleration variation calculation means; a presumption means for presuming, when the result of the comparison by the comparison means shows that a tire has a larger acceleration variation than the acceleration variations of the other tires, that the tire has a decreased air pressure; an examination means for identifying, based on the tire rotation speed information of the respective wheels, a tire having a rotation speed that is higher than the rotation speeds of the other tires or that is lower than a predetermined criterion; and a determination means for determining that a tire has a decreased air pressure when the tire identified by the estimation means is also identified by the examination means.

In the detection apparatus according to the invention of the previous application, the comparison means is used to compare acceleration variations of the respective tires. When the result shows that a tire has an acceleration variation larger than acceleration variations of the other tires, based on tire rotation speed information of the respective wheels, there is further detected a tire that has a rotation speed higher than the rotation speeds of the other tires or lower than a predetermined criterion. When a tire identified through the comparison of the acceleration variation is identical with a tire identified through the comparison of the rotation speed, a pressure decrease of the tire is determined. This can consequently avoid the generation of a false alarm in the case where only acceleration variations are compared. As a result, a status where the air pressure of one tire is completely zero can be accurately determined.

When a tire having a decreased pressure is determined only based on the acceleration variation of the tire, a case where a tire is fitted with a snow chain for example as described above causes a wrong determination in which the tire fitted with the snow chain has an abnormal air pressure in spite of the fact that the tire has a normal internal pressure. However, the present inventor has found that, when the air pressure of one tire is completely zero, the tire has a rotation speed higher than those of the other tires or, on the contrary, the tire has a rotation speed lower than those of the other tires. The present inventor also has found that the degree of delay in rotation speed of the tire is More significant than in the case of the tire fitted with a snow chain. In view of this, when a tire identified based on the acceleration variations of the tires is identical with a tire identified based on the rotation speeds of the tires (Namely, a tire having a speed higher or remarkably slower than those of the other tires. The degree of "slowness" in speed of the tire is much larger than that of a tire fitted with a snow chain.), it is determined that the tire has a decreased air pressure. This can consequently prevent the apparatus from determining wrongly that a tire fitted with a snow chain is "decreased in the air pressure" when the tire has an increased acceleration variation.

CITATION LIST

Patent Literature

Patent Literature 1: Japanese Unexamined Patent Publication No. 1988-305011

Patent Literature 2: Japanese Unexamined Patent Publication No. 2007-182211

SUMMARY OF INVENTION

Technical Problem

In the above-described invention of the previous application, even in the case of a driven wheel having no possibility of being fitted with a snow chain, some degree at which one tire has a rotation speed that is lower than the rotation speeds of the other tires (and that is not lower than the predetermined criteria) may result in a determination that the one tire is fitted with a snow chain and thus has a lowered rotation speed, thus failing to determine a decreased pressure.

However, in the case of a driven wheel, the degree at which one tire has a rotation speed that is lower than the rotation speeds of the other tires may not be differentiated between the case where an internal pressure is zero and the case where the tire is fitted with a snow chain. Thus, there may be a case where a decreased pressure is not determined in spite of the fact that the internal pressure is actually zero.

The present invention has been made in view of the situation as described above. It is an objective of the present invention to provide an apparatus, a method, and a program for detecting a decrease in a tire air pressure by which a tire of a completely-zero air pressure can be detected securely.

Solution to Problem (1) In accordance with the present invention, there is provided an apparatus for detecting a decrease in an air pressure of a tire attached to a vehicle (hereinafter also simply referred to as "detection apparatus"), comprising:

a rotation speed detection means for periodically detecting rotation speeds of tires of the respective wheels of the vehicle;

an acceleration calculation means for calculating, based on rotation speed information obtained from the rotation speed detection means, accelerations of the respective tires;

an acceleration variation calculation means for calculating, based on the accelerations of the respective tires calculated by the acceleration calculation means, acceleration variations of the respective tires;

a comparison means for comparing the acceleration variations of the respective tires calculated by the acceleration variation calculation means;

a presumption means for presuming, when a comparison result by the comparison means shows that an acceleration variation of a tire is higher than acceleration variations of the other tires, a pressure decrease of the tire;

an examination means for identifying, based on the tire rotation speed information of the respective wheels, a tire having a rotation speed that is higher than the rotation speeds of the other tires or that is lower than a predetermined criterion; and a determination means for determining, when a tire identified by the presumption means is identical with a tire identified by the examination means, a pressure decrease of the tire, wherein the predetermined criterion defines a degree at which, when four tires have a normal internal pressure and one of the four tires is fitted with a snow chain, the tire has a lower rotation speed than the rotation speeds of the other tires, the examination means is further configured to identify, based on the tire rotation speed information of the respective wheels, a tire having a rotation speed lower than the rotation speeds of the other tires, and the determination means is configured to determine that a tire has a decreased air pressure when the tire identified by the presumption means is identical with the slowest tire identified by the examination means and when the slowest tire is positioned at a driven wheel.

In the detection apparatus of the present invention, the examination means is used to identify a tire having a rotation speed lower than the rotation speeds of the other tires. When the slowest tire is identical with a tire identified by the presumption means and when the slowest tire is positioned at a driven wheel, it is determined that the tire has a decreased air pressure. Thus, a tire of a driven wheel having a completely-zero internal pressure can be detected securely.

(2) In the detection apparatus of (1), the detection apparatus preferably comprises a wheel torque acquisition means for acquiring wheel torques of the respective wheels of the vehicle, and the determination means preferably determines that a wheel for which a wheel torque value acquired by the wheel torque acquisition means is 0 (Nm) when the vehicle is not stopped is a driven wheel.

(3) In accordance with the present invention, there is also provided a method for detecting a decrease in an air pressure of a tire attached to a vehicle (hereinafter also simply referred to as "detection method"), comprising:

a rotation speed detection step of periodically detecting rotation speeds of tires of the respective wheels of the vehicle;

an acceleration calculation step of calculating, based on rotation speed information obtained in the rotation speed detection step, accelerations of the respective tires;

an acceleration variation calculation step of calculating, based on accelerations of the respective tires calculated in the acceleration calculation step, acceleration variations of the respective tires;

a comparison step of comparing acceleration variations of the respective tires calculated in the acceleration variation calculation step;

a presumption step of presuming, when a comparison result by the comparison step shows that an acceleration variation of a tire is higher than acceleration variations of the other tires, a pressure decrease of the tire;

an examination step of identifying, based on the tire rotation speed information of the respective wheels, a tire having a rotation speed that is higher than the rotation speeds of the other tires or that is lower than a predetermined criterion; and a determination step of determining, when a tire identified in the estimation step is identical with a tire identified in the examination step, a pressure decrease of the tire, wherein the predetermined criterion defines a degree at which, when four tires have a normal internal pressure and when one of the four tires is fitted with a snow chain, the tire has a lower rotation speed than the rotation speeds of the other tires, the examination step further identifies, based on the tire rotation speed information of the respective wheels, a tire having a rotation speed lower than the rotation speeds of the other tires, and the determination step determines that a tire has a decreased air pressure when the tire identified in the presumption step is identical with the slowest tire identified in the examination step and when the slowest tire is positioned at a driven wheel.

(4) In the detection method of (3), the detection method preferably comprises a wheel torque acquisition step of acquiring wheel torques of the respective wheels of the vehicle, and the determination step preferably determines that a wheel for which a wheel torque value acquired by the wheel torque acquisition step is 0 (Nm) when the vehicle is not stopped is a driven wheel.

(5) In accordance with the present invention, there is further provided a program which causes, in order to detect a decrease in an air pressure of a tire attached to a vehicle, a computer to function as:

an acceleration calculation means for calculating, based on rotation speed information obtained from a rotation speed detection means for periodically detecting rotation speeds of tires of the respective wheels of the vehicle, accelerations of the respective tires;

an acceleration variation calculation means for calculating, based on the accelerations of the respective tires calculated by the acceleration calculation means, acceleration variations of the respective tires;

a comparison means for comparing the acceleration variations of the respective tires calculated by the acceleration variation calculation means;

a presumption means for presuming, when a comparison result by the comparison means shows that an acceleration variation of a tire is larger than acceleration variations of the other tires, a pressure decrease of the tire;

an examination means for identifying, based on the tire rotation speed information of the respective wheels, a tire having a rotation speed that is higher than the rotation speeds of the other tires or that is lower than a predetermined criterion; and a determination means for determining, when a tire identified by the presumption means is identical with a tire identified by the examination means, a pressure decrease of the tire, wherein the predetermined criterion defines a degree at which, when four tires have a normal internal pressure and one of the four tires is fitted with a snow chain, the tire has a lower rotation speed than the rotation speeds of the other tires, the examination means is further configured to identify, based on the tire rotation speed information of the respective wheels, a tire having a rotation speed lower than the rotation speeds of the other tires, and the determination means is configured to determine that a tire has a decreased air pressure when the tire identified by the presumption means is identical with the slowest tire identified by the examination means and when the slowest tire is positioned at a driven wheel.

(6) In the program of (5), the computer is preferably caused to further function as a wheel torque acquisition means for acquiring wheel torques of the respective wheels of the vehicle, and the determination means preferably determines that a wheel for which a wheel torque value acquired by the wheel torque acquisition means is 0 (Nm) when the vehicle is not stopped is a driven wheel.

Advantageous Effects of Invention

According to the apparatus, method, and program for detection of the present invention, one tire having a completely-zero air pressure can be detected securely.

DESCRIPTION OF EMBODIMENTS

Hereinafter, with reference to the attached drawings, an embodiment of a detection apparatus, a method and a program of the present invention will be described in detail.

Figure 1:
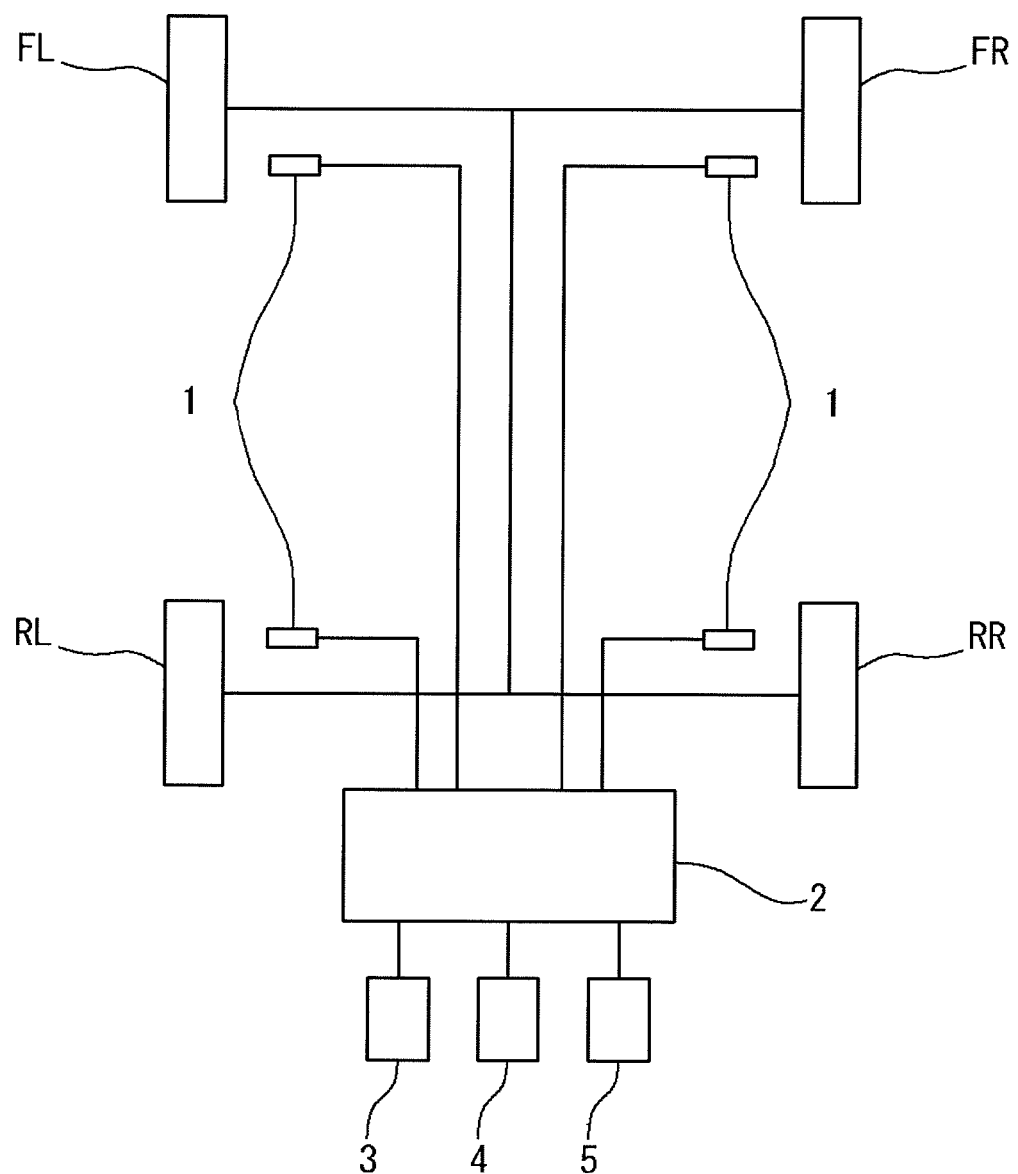
FIG. 1 is a block diagram illustrating one embodiment of a detection apparatus of the present invention.

As shown in FIG. 1, a detection apparatus according to one embodiment of the present invention includes a normal wheel speed detection means (rotation speed detection means) 1 in order to detect the rotation speeds of four tires provided in a four-wheel vehicle of a left front wheel (FL), a right front wheel (FR), a left rear wheel (RL), and a right rear wheel (RR). The normal wheel speed detection means (rotation speed detection means) 1 is provided to be associated with the respective tires.

The wheel speed detection means 1 may be, for example, a wheel speed sensor that uses an electromagnetic pickup for example to generate a rotation pulse to measure an angular velocity and a wheel speed based on the number of pulses or an angular velocity sensor such as a one that generates power using rotation as in a dynamo to measure an angular velocity and a wheel speed based on the voltage of the gerated power. The output from the wheel speed detection means 1 is given to a control unit 2 that is a computer such as ABS. Connected to the control unit 2 are a display unit 3 comprising a liquid crystal display element, a plasma display element or CRT for example for displaying a tire having a decreased pressure; an initialization button 4 that can be operated by a driver; and an alarm unit 5 for notifying a driver of a tire having a decreased pressure.

Figure 2:
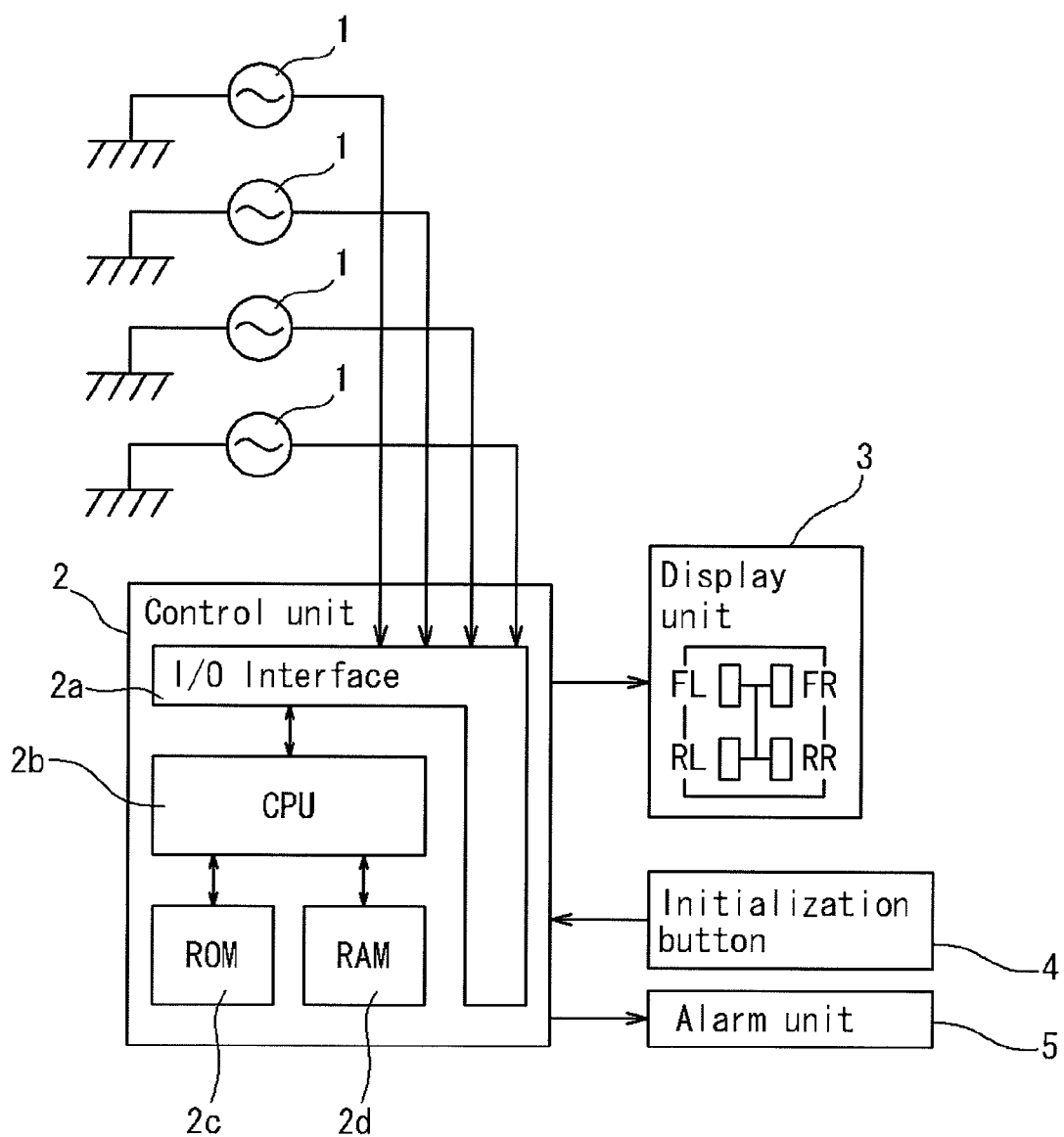
FIG. 2 is a block diagram illustrating an electric configuration of the detection apparatus shown in FIG. 1.

As shown in FIG. 2, the control unit 2 is composed of: an I/O interface 2a required for the exchange of a signal with an external apparatus; a CPU 2b functioning as a computation processing center; a ROM 2c storing therein a control operation program of the CPU 2b; and a RAM 2d into which data is temporarily written or from which the written data is read out when the CPU 2b performs a control operation.

The wheel speed detection means 1 outputs a pulse signal corresponding to the rotation number of a tire (hereinafter also referred to as "wheel speed pulse"). The CPU 2b calculates, based on the wheel speed pulse outputted from the wheel speed detection means 1, the angular velocities Fi of the respective tires ($F_1$ to $F_4$) at every predetermined sampling cycle $\Delta T$ (sec) (e.g., $\Delta T$=0.05 second). $F_1$, $F_2$, $F_3$ and $F_4$ represent angular velocities of a left front wheel (FL) tire, a right front wheel (FR) tire, a left rear wheel (RL) tire, and a right rear wheel (RR) tire, respectively.

Since tires are manufactured to include variations within standards (initial difference), the respective tires do not always have an identical effective rolling radius (a value obtained by dividing a distance of one rotation by 2n) even when all of the tires have a normal internal pressure. Due to this reason, the respective tires have varied angular velocities $F_i$. Thus, in order to cancel the variation due to the initial difference, a corrected angular speed $F1_i$ is calculated. Specifically, the correction is made as shown below.

$$F1_1 = F_1$$

$$F1_2 = mF_2$$

$$F1_3 = F_3$$

$$F1_4 = nF_4$$

The correction factors m and n are acquired by, for example, calculating the angular velocity $F_i$ based on a condition that the vehicle is running straight to assume $m = F_1/F_2$ and $n = F_3/F_4$ based on the calculated angular velocity $F_i$.

Then, based on the $F_i$, the tire rotation speed is calculated. Based on the rotation speed, the tire acceleration is calculated.

A detection apparatus according to the present embodiment is composed of: a wheel speed detection means (rotation speed detection means) 1 for periodically detecting rotation speeds of tires of the respective wheels of the vehicle; an acceleration calculation means for calculating, based on rotation speed information obtained from the rotation speed detection means, accelerations of the respective tires; an acceleration variation calculation means for calculating, based on the accelerations of the respective tires calculated by the acceleration calculation means, acceleration variations of the respective tires; a comparison means for comparing the acceleration variations of the respective tires calculated by the acceleration variation calculation means; a presumption means for presuming, when a comparison result by the comparison means shows that a tire has an acceleration variation larger than acceleration variations of the other tires, a pressure decrease of the tire; an examination means for identifying, based on the tire rotation speed information of the respective wheels, a tire having a rotation speed that is higher than the rotation speeds of the other tires or that is lower than a predetermined criterion; and a determination means for determining, when a tire identified by the estimation means is identical with a tire identified by the estimation means, a pressure decrease of the tire. The predetermined criterion defines a degree at which, when four tires have a normal internal pressure and one of the four tires is fitted with a snow chain, the tire has a lower rotation speed than the rotation speeds of the other tires. The examination means is further configured to identify, based on tire rotation speed information of the respective wheels, a tire having a rotation speed lower than the rotation speeds of the other tires. The determination means is configured to determine that a tire has a decreased air pressure when the tire identified by the estimation means is identical with the slowest tire identified by the examination means and when the slowest tire is positioned at a driven wheel.

A program of the present invention causes the control unit 2 to function as the acceleration calculation means, the acceleration variation calculation means, the comparison means, the presumption means, the examination means, and the determination means.

In the present invention, based on the accelerations of the respective tires, the acceleration variations of the respective tires are calculated. This acceleration variation is an integration value of 25 absolute values of acceleration (corresponding to 1 second) each of which is calculated at a predetermined interval (e.g., 40 ms). By comparing the integration values calculated for the respective tires, it is determined, when a tire has an integration value different from the integration values of the other tires, that the tire may have an abnormal air pressure (in particular, an air pressure of zero). Namely, a tire having a decreased air pressure is presumed. The calculated acceleration variations of the respective tires are compared by calculating a ratio of the respective acceleration variations or a difference thereamong. When the ratio or difference is larger than a predetermined threshold value, an abnormal airpressure is determined. This threshold value can be obtained in advance by a running test of a vehicle in which one of the four tires has an air pressure of zero, for example.

In the present invention, based on the tire rotation speed information of the respective wheels, there are identified (A) a tire having a higher rotation speed than the rotation speeds of the other tires, (B) a tire having a rotation speed lower than a predetermined criterion, and (C) a tire having a rotation speed lower than the rotation speeds of the other tires.

In other words, a tire having a rotation speed higher than those of the other three tires, a tire having a rotation speed lower than the predetermined criterion, or a tire having the lowest rotation speed is identified. Then, based on the identification result and the presumption result by the presumption means which will be described later, a tire having a decreased pressure is determined. The identification of (A) and (B) can be carried out in the manner as described below for example.

Specifically, the rotation speeds of the respective wheels are assumed as FLs (left front wheel), FRs (right front wheel), RLs (left rear wheel), and RRs (right rear wheel). Then, DEL1_R, DEL2_R, and DEL3_R represented by the following formulae (1) to (3) are calculated and are compared with predetermined threshold values (see table 1), whereby a tire having a higher rotation speed than those of the other three wheels or a tire having a very low rotation speed can be identified.

$$DEL1\_R = [\{(FLs+RRs)/(FRs+RLs)\} - 1] \times 100(\%) \quad (1)$$

$$DEL2\_R = [\{(FLs+FRs)/(RLs+RRs)\} - 1] \times 100(\%) \quad (2)$$

$$DEL3\_R = [\{(FLs+RLs)/(FRs+RRs)\} - 1] \times 100(\%) \quad (3)$$

TABLE 1

| | DEL1_R | DEL2_R | DEL3_R |
|---|---|---|---|
| Slower (FR) | DEL1_R>#ThSlowerDEL1 | DEL2_R<#ThSlowerDEL2 | DEL3_R>#ThSlowerDEL3 |
| Slower (FL) | DEL1_R<#ThSlowerDEL1 | DEL2_R<#ThSlowerDEL2 | DEL3_R<#ThSlowerDEL3 |
| Slower (RR) | DEL1_R<#ThSlowerDEL1 | DEL2_R>#ThSlowerDEL2 | DEL3_R<#ThSlowerDEL3 |
| Slower (RL) | DEL1_R>#ThSlowerDEL1 | DEL2_R>#ThSlowerDEL2 | DEL3_R<#ThSlowerDEL3 |
| Faster (FR) | DEL1_R<#ThFasterDEL1 | DEL2_R>#ThFasterDEL2 | DEL3_R<#ThFasterDEL3 |
| Faster (FL) | DEL1_R>#ThFasterDEL1 | DEL2_R>#ThFasterDEL2 | DEL3_R>#ThFasterDEL3 |
| Faster (RR) | DEL1_R>#ThFasterDEL1 | DEL2_R<#ThFasterDEL2 | DEL3_R<#ThFasterDEL3 |
| Faster (RL) | DEL1_R<#ThFasterDEL1 | DEL2_R<#ThFasterDEL2 | DEL3_R>#ThFasterDEL3 |

The predetermined threshold value can be obtained by an experiment, and threshold values for determining a tire that has a lower rotation speed than those of the other tires because the tire has a zero-air pressure (#ThSlowerDEL1, #ThSlowerDEL2, #ThSlowerDEL3) take values within a range of 3 to 10, for example. Threshold values for determining a tire that has a higher rotation speed than those of the other tires because the tire has a zero-air pressure (#ThFasterDEL1, #ThFasterDEL2, #ThFasterDEL3) take values within a range of 0 to 0.3, for example.

When a snow chain is attached to one of the four tires when their internal pressure is normal, the tire fitted with the snow chain has a rotation speed lower than those of the other tires, and a threshold value for identifying the tire having such lower rotation speed is within a range of about 0.05 to 1, for example. As described above, the degree of the lower rotation speed is different between the case where one tire has an internal pressure of zero and the case where one tire is fitted with the snow chain. Thus, these cases can be clearly differentiated by changing the threshold value. When a tire has an internal pressure of zero, the tire has a reduced dynamic loaded radius. Thus, the tire rotation speed is generally increased. However, the present inventor has found that the rotation speed is lower in some cases at a more significant degree than in a case where the tire is fitted with a snow chain. It is presumed, as the reason why the tire rotation speed is much lower when the tire has an internal pressure of zero, that the zero internal pressure causes the tire tread to have contact with the rim to generate friction due to which the rotation speed is lowered.

The tire (c) can be identified by a relative comparison among the rotation speeds of the respective wheels of FLs (left-front wheel), FRs (right front wheel), RLs (left rear wheel), and RRs (right rear wheel). In this case, in consideration of a measurement error, a wheel having a rotation speed lower than the average of the rotation speeds of the other three wheels by 0.2% or more can be determined as "a wheel having the slowest rotation speed."

Figure 3:
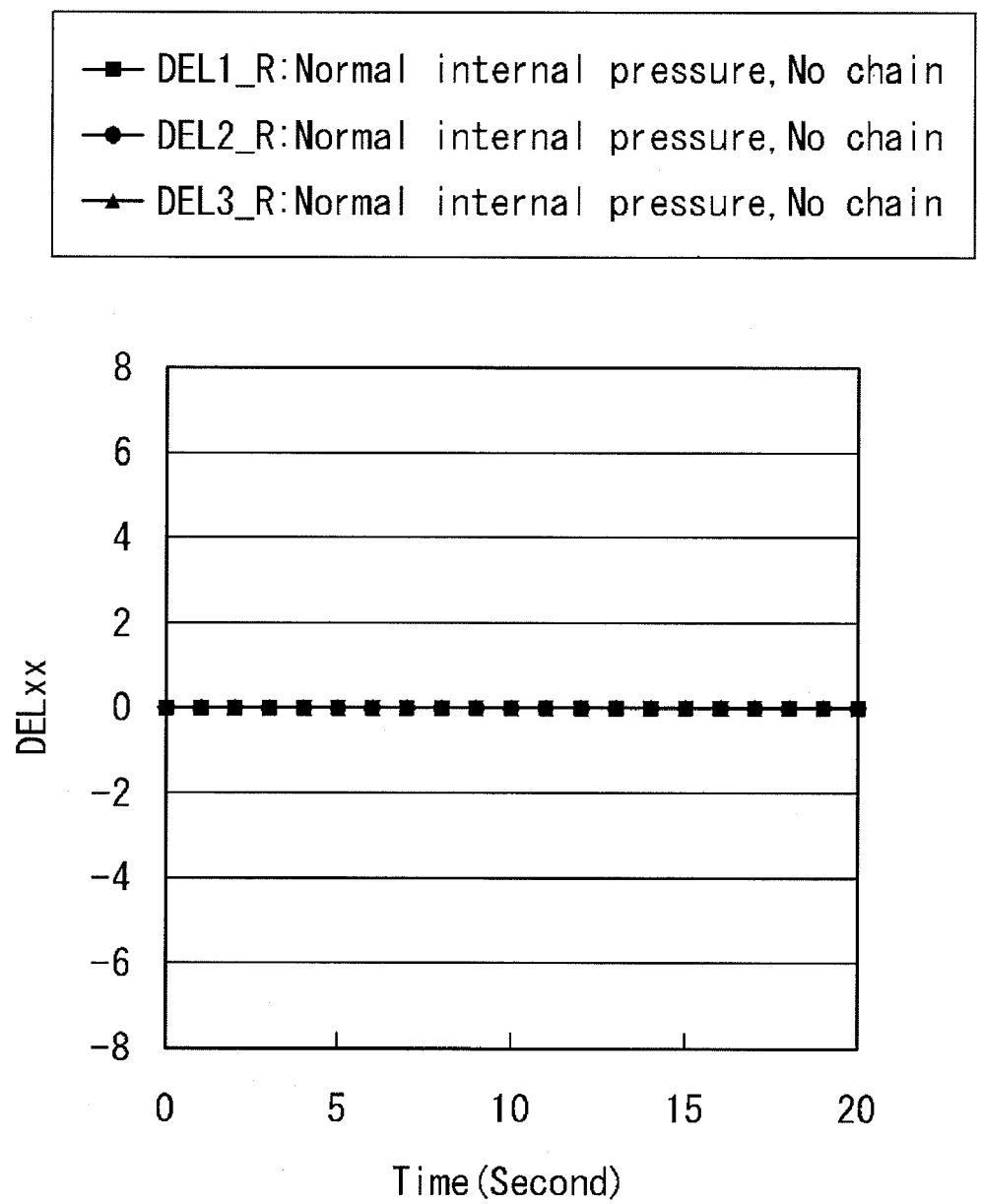
FIG. 3 illustrates a relation between DEL and time.
Figure 4:
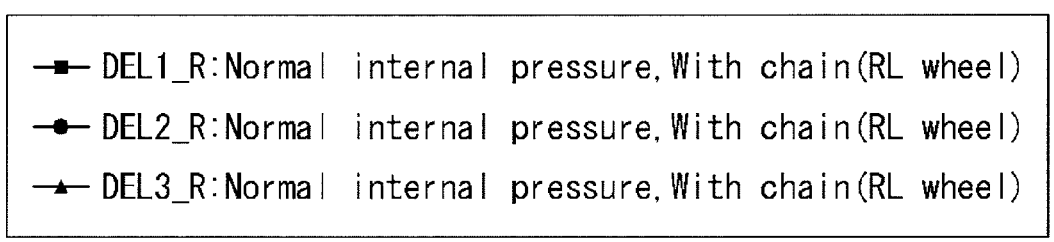
FIG. 4 illustrates a relation between DEL and time.
Figure 4:
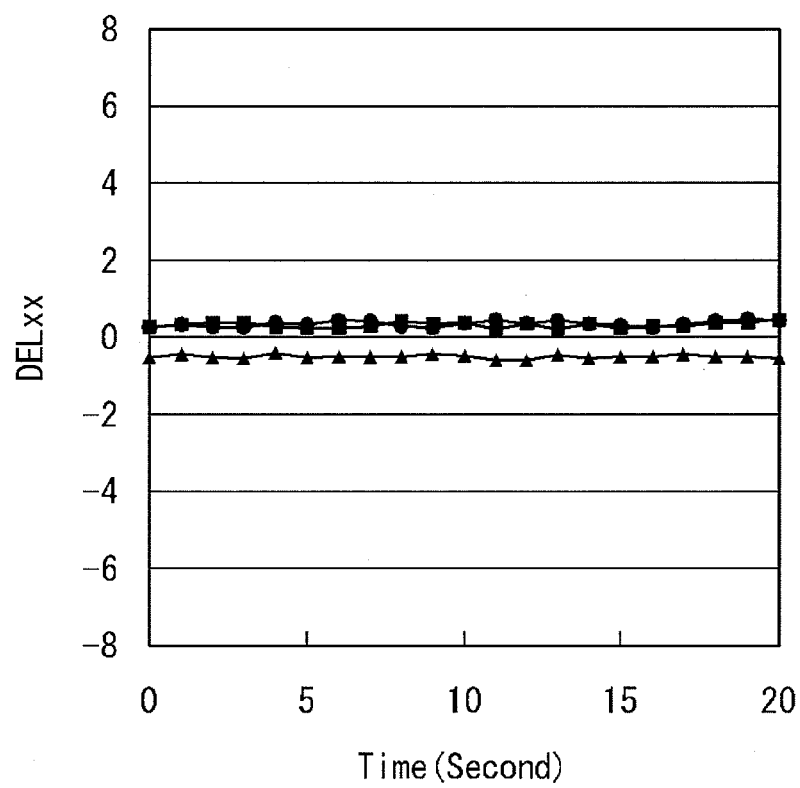
Figure 5:
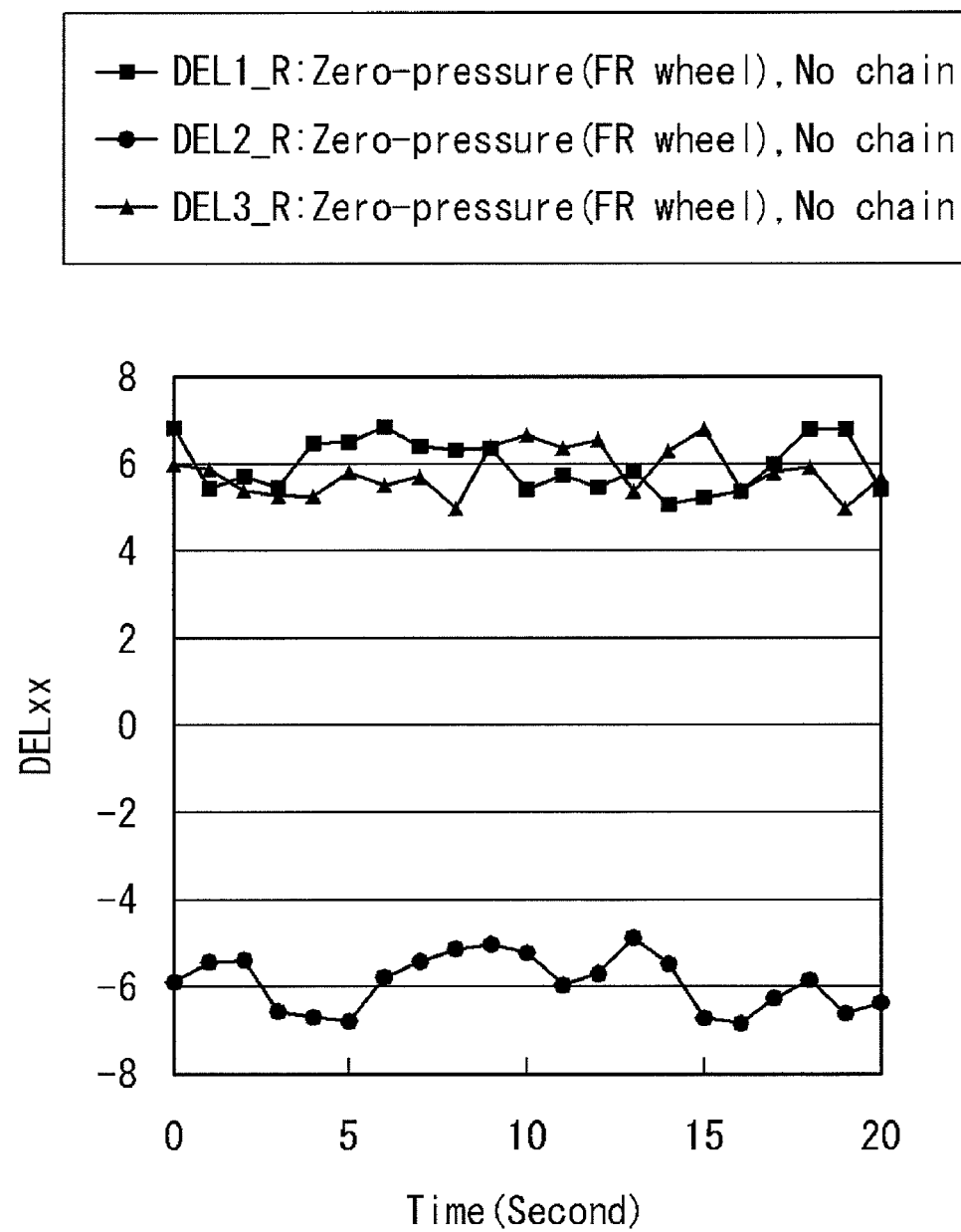
FIG. 5 illustrates a relation between DEL and time.

FIG. 3 to FIG. 5 illustrate examples of the DEL1_R to DEL3_R obtained by experiment. FIG. 3 shows the values of DEL1_R to DEL3_R in the case where four tires have a normal internal pressure and none of the tires is fitted with a snow chain. FIG. 4 shows the values of DEL1_R to DEL3_R in the case where four tires have a normal internal pressure and the left rear tire (RL wheel) is fitted with a snow chain. FIG. 5 shows the values of DEL1_R to DEL3_R in the case where the right front tire (FR wheel) has a zero-internal pressure and none of the tires is fitted with a snow chain. Table 2 shows the experimental results, which are also shown in FIG. 3 to FIG. 5, in tabulated form. The experiment was conducted with an FR (front-engine, rear-wheel drive layout) vehicle fitted with winter tires (225/55R16).

TABLE 2

| Time | Normal internal pressure, No chain | | | Normal internal pressure, With chain (RL wheel) | | | Zero-pressure (FR wheel), No chain | | |
|---|---|---|---|---|---|---|---|---|---|
| (second) | DEL1_R | DEL2_R | DEL3_R | DEL1_R | DEL2_R | DEL3_R | DEL1_R | DEL2_R | DEL3_R |
| 0 | 0 | 0 | 0.01 | 0.3 | 0.33 | −0.5 | 6.9 | −6 | 6 |
| 1 | 0.01 | 0.01 | −0.02 | 0.38 | 0.34 | −0.33 | 5.5 | −5.5 | 5.9 |
| 2 | 0 | 0 | 0.02 | 0.4 | 0.33 | −0.44 | 5.7 | −5.5 | 5.5 |
| 3 | −0.01 | −0.01 | 0 | 0.39 | 0.32 | −0.5 | 5.5 | −6.7 | 5.4 |
| 4 | −0.01 | −0.01 | 0.02 | 0.35 | 0.44 | −0.33 | 6.5 | −6.8 | 5.3 |
| 5 | −0.02 | 0 | 0 | 0.3 | 0.39 | −0.5 | 6.6 | −6.9 | 5.9 |
| 6 | 0 | −0.02 | −0.01 | 0.31 | 0.45 | −0.44 | 6.9 | −5.9 | 5.6 |
| 7 | 0.01 | 0.02 | −0.01 | 0.38 | 0.46 | −0.48 | 6.5 | −5.5 | 5.8 |
| 8 | 0.02 | 0 | 0 | 0.44 | 0.33 | −0.49 | 6.4 | −5.2 | 5.1 |
| 9 | −0.01 | −0.01 | 0 | 0.37 | 0.34 | −0.39 | 6.3 | −5.1 | 6.5 |
| 10 | −0.01 | −0.01 | −0.01 | 0.43 | 0.45 | −0.4 | 5.5 | −5.3 | 6.8 |
| 11 | 0.01 | −0.02 | 0.01 | 0.36 | 0.48 | −0.48 | 5.8 | −6 | 6.5 |
| 12 | 0.02 | 0.02 | 0.02 | 0.42 | 0.44 | −0.49 | 5.5 | −5.8 | 6.6 |
| 13 | 0.01 | 0 | 0 | 0.35 | 0.49 | −0.43 | 5.9 | −5 | 5.5 |
| 14 | 0.02 | 0 | −0.02 | 0.41 | 0.39 | −0.5 | 5.2 | −5.5 | 6.3 |
| 15 | 0 | −0.01 | 0.01 | 0.3 | 0.33 | −0.42 | 5.3 | −6.8 | 6.9 |
| 16 | −0.02 | −0.02 | −0.02 | 0.33 | 0.3 | −0.41 | 5.5 | −6.9 | 5.5 |
| 17 | 0.01 | 0.01 | 0.02 | 0.34 | 0.4 | −0.33 | 6 | −6.4 | 5.9 |
| 18 | 0 | 0.01 | 0 | 0.37 | 0.45 | −0.38 | 6.9 | −6 | 6 |
| 19 | 0.01 | 0.02 | 0.01 | 0.39 | 0.5 | −0.4 | 6.9 | −6.7 | 5.1 |
| 20 | 0 | 0 | −0.01 | 0.5 | 0.49 | −0.43 | 5.5 | −6.5 | 5.8 |

As can be seen from FIGS. 3 to 5 and Table 2, when the four tires have a normal internal pressure and a snow chain is not attached to any of the tires, DEL1_R, DEL2_R, and DEL3_R are substantially zero. On the other hand, when the four tires have a normal internal pressure and the left rear tire (RL wheel) is fitted with a snow chain, DEL1_R and DEL2_R are within a range of 0.3 to 0.5 and DEL3_R is within a range of −0.33 to −0.5. When the right front tire (FR wheel) has a zero-internal pressure and a snow chain is not attached to any of the tires, DEL1_R and DEL3_R are within a range of 5.1 to 6.9 and DEL2_R is within a range of −5.1 to −6.9. As described above, the values of DEL1_R-DEL3_R are significantly different between the case of the experiment with the tire having a zero-internal pressure and the case of the experiment with the tire fitted with a snow chain. Thus, by setting a threshold value appropriately, a lower rotation speed due to a tire having a zero-internal pressure and a lower rotation speed due to a tire fitted with a snow chain can be clearly differentiated.

Next, in the present invention, when the tire identified (or examined) as the tire (A) or tire (B) based on the rotation speed thereof is identical with the tire identified (or presumed) through the comparison of acceleration variations, it is determined that the tire has a decreased air pressure. As described above, one tire having a decreased pressure is determined based not only on the determination result based on the acceleration variations but also on the determination result based on the rotation speeds (in this determination, cases of a decreased rotation speed of a tire due to a snow chain are excluded). Thus, a decreased pressure can be determined with a high degree of accuracy.

Furthermore, in the present invention, when the tire identified (or examined) as the tire (C) based on the rotation speed is identical with a tire identified (or presumed) based on a comparison of acceleration variations, and when the tire is positioned at a driven wheel, it is also determined that the tire has a decreased air pressure. As mentioned before, even in the case of a driven wheel having no possibility of being fitted with a snow chain, some degree at which one tire has a rotation speed that is lower than the rotation speeds of the other tires (and that is not lower than the predetermined criterion) leads a determination that the tire is fitted with a snow chain and thus has a lowered rotation speed, thus failing to determine a decreased pressure. In the case of a driven wheel, the degree at which one tire has a rotation speed that is lower than the rotation speeds of the other tires may not be differentiated between the case where an internal pressure is zero and the case where the tire is fitted with a snow chain. Thus, there may be a case where a decreased pressure is not determined in spite of the fact that the internal pressure of the tire is actually zero. To prevent this, in the present invention, when a tire identified (or presumed) by the comparison of acceleration variations is the slowest tire and is also a tire attached to a driven wheel, it is determined that the tire has a decreased pressure. This can consequently eliminate a disadvantage of failing to determine a decreased pressure in spite of the fact that the tire has an air pressure of zero.

Whether a wheel is a driven wheel or a driving wheel can be determined by acquiring the wheel torque of the wheel. Specifically, whether the wheel is a driven wheel or a driving wheel can be determined based on whether the wheel torque value is zero or other than zero when the vehicle speed has a value other than zero, that is, the vehicle is not stopped. Information on such wheel torque can be obtained together with the speed of the rotating wheel, from the Antilock Brake System (ABS) for example.

What is claimed is:

1. An apparatus for detecting a decrease in an air pressure of a tire attached to a vehicle, comprising:
   a rotation speed detection means for periodically detecting rotation speeds of tires of the respective wheels of the vehicle;
   an acceleration calculation means for calculating, based on rotation speed information obtained from the rotation speed detection means, accelerations of the respective tires;
   an acceleration variation calculation means for calculating, based on the accelerations of the respective tires calculated by the acceleration calculation means, acceleration variations of the respective tires;
   a comparison means for comparing the acceleration variations of the respective tires calculated by the acceleration variation calculation means;
   a presumption means for presuming, when a comparison result by the comparison means shows that an acceleration variation of a tire is larger than acceleration variations of the other tires, a pressure decrease of the tire;
   an examination means for identifying, based on the tire rotation speed information of the respective wheels, a tire having a rotation speed that is higher than the rotation speeds of the other tires or that is lower than a predetermined criterion; and
   a determination means for determining, when a tire identified by the presumption means is identical with a tire identified by the examination means, a pressure decrease of the tire,
   wherein the predetermined criterion defines a degree at which, when four tires have a normal internal pressure and one of the four tires is fitted with a snow chain, the tire has a lower rotation speed than the rotation speeds of the other tires,
   the examination means is further configured to identify, based on the tire rotation speed information of the respective wheels, a tire having a rotation speed lower than the rotation speeds of the other tires, and
   the determination means is configured to determine that a tire has a decreased air pressure when the tire identified by the presumption means is identical with the slowest tire identified by the examination means and when the slowest tire is positioned at a driven wheel.

2. The apparatus for detecting a decrease in an air pressure of a tire according to claim 1, wherein the apparatus further comprises a wheel torque acquisition means for acquiring wheel torques of the respective wheels of the vehicle, and the determination means determines that a wheel for which a wheel torque value acquired by the wheel torque acquisition means is 0 (Nm) when the vehicle is not stopped is a driven wheel.

3. A method for detecting a decrease in an air pressure of a tire attached to a vehicle, comprising:
   a rotation speed detection step of periodically detecting rotation speeds of tires of the respective wheels of the vehicle;
   an acceleration calculation step of calculating, based on rotation speed information obtained in the rotation speed detection step, accelerations of the respective tires;
   an acceleration variation calculation step of calculating, based on accelerations of the respective tires calculated in the acceleration calculation step, acceleration variations of the respective tires;
   a comparison step of comparing acceleration variations of the respective tires calculated in the acceleration variation calculation step;
   a presumption step of presuming, when a comparison result by the comparison step shows that an acceleration variation of a tire is larger than acceleration variations of the other tires, a pressure decrease of the tire;
   an examination step of identifying, based on the tire rotation speed information of the respective wheels, a tire having a rotation speed that is higher than the rotation speeds of the other tires or that is lower than a predetermined criterion; and
   a determination step of determining, when a tire identified in the estimation step is identical with a tire identified in the examination step, a pressure decrease of the tire,
   wherein the predetermined criterion defines a degree at which, when four tires have a normal internal pressure and when one of the four tires is fitted with a snow chain, the tire has a lower rotation speed than the rotation speeds of the other tires,
   the examination step further identifies, based on the tire rotation speed information of the respective wheels, a tire having a rotation speed lower than the rotation speeds of the other tires, and
   the determination step determines that a tire has a decreased air pressure when the tire identified in the presumption step is identical with the slowest tire identified in the examination step and when the slowest tire is positioned at a driven wheel.

4. The method for detecting a decrease in an air pressure of a tire according to claim 3, wherein the method further comprises a wheel torque acquisition step of acquiring wheel torques of the respective wheels of the vehicle, and the determination step determines that a wheel for which a wheel torque value acquired by the wheel torque acquisition step is 0 (Nm) when the vehicle is not stopped is a driven wheel.

5. A program which causes, in order to detect a decrease in an air pressure of a tire attached to a vehicle, a computer to function as:
- an acceleration calculation means for calculating, based on rotation speed information obtained from a rotation speed detection means for periodically detecting rotation speeds of tires of the respective wheels of the vehicle, accelerations of the respective tires;
- an acceleration variation calculation means for calculating, based on the accelerations of the respective tires calculated by the acceleration calculation means, acceleration variations of the respective tires;
- a comparison means for comparing the acceleration variations of the respective tires calculated by the acceleration variation calculation means;
- a presumption means for presuming, when a comparison result by the comparison means shows that an acceleration variation of a tire is larger than acceleration variations of the other tires, a pressure decrease of the tire;
- an examination means for identifying, based on the tire rotation speed information of the respective wheels, a tire having a rotation speed that is higher than the rotation speeds of the other tires or that is lower than a predetermined criterion; and
- a determination means for determining, when a tire identified by the presumption means is identical with a tire identified by the examination means, a pressure decrease of the tire, wherein the predetermined criterion defines a degree at which, when four tires have a normal internal pressure and one of the four tires is fitted with a snow chain, the tire has a lower rotation speed than the rotation speeds of the other tires, the examination means is further configured to identify, based on the tire rotation speed information of the respective wheels, a tire having a rotation speed lower than the rotation speeds of the other tires, and the determination means is configured to determine that a tire has a decreased air pressure when the tire identified by the presumption means is identical with the slowest tire identified by the examination means and when the slowest tire is positioned at a driven wheel.

6. The program for detecting a decrease in an air pressure of a tire according to claim 5, wherein the computer is further caused to function as a wheel torque acquisition means for acquiring wheel torques of the respective wheels of the vehicle, and the determination means determines that a wheel for which a wheel torque value acquired by the wheel torque acquisition means is 0 (Nm) when the vehicle is not stopped is a driven wheel.

* * * * *